United States Patent
Kang

(10) Patent No.: US 8,663,838 B2
(45) Date of Patent: Mar. 4, 2014

(54) CYLINDRICAL SECONDARY BATTERY INCLUDING CENTER PIN HAVING IMPROVED STRUCTURE

(75) Inventor: Cho-Hee Kang, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 686 days.

(21) Appl. No.: 12/805,884

(22) Filed: Aug. 23, 2010

(65) Prior Publication Data

US 2011/0081565 A1 Apr. 7, 2011

(30) Foreign Application Priority Data

Oct. 1, 2009 (KR) ........................ 10-2009-0094049

(51) Int. Cl.
*H01M 2/18* (2006.01)
*H01M 4/10* (2006.01)

(52) U.S. Cl.
USPC ............. 429/186; 429/94; 429/122; 429/174; 429/208

(58) Field of Classification Search
USPC ............................ 429/94, 122, 174, 186, 208
See application file for complete search history.

(56) References Cited

U.S. PATENT DOCUMENTS

2003/0198863 A1* 10/2003 Murashige et al. ............. 429/53
2006/0024571 A1 2/2006 Kim et al.
2006/0257735 A1* 11/2006 Kim ............................... 429/208
2007/0269711 A1 11/2007 Meguro et al.
2009/0061304 A1 3/2009 Muraoka et al.

FOREIGN PATENT DOCUMENTS

| JP | 11204140 | 7/1999 |
|---|---|---|
| KR | 10-2000-0076884 | 12/2000 |
| KR | 1020050122682 | 12/2005 |
| KR | 10-0614372 B1 | 8/2006 |
| KR | 1 0-0624907 | 9/2006 |
| KR | 10-0684732 | 2/2007 |
| KR | 10-0824849 | 4/2008 |
| KR | 10-2009-0037834 | 4/2009 |

OTHER PUBLICATIONS

Korean Office Action issued by Korean Patent Office on Mar. 11, 2011. Corresponding to Korean Patent Application No. 10-2009-0094049 and "Request for Entry of the Accompanying Office Acfion" attached herewith.

* cited by examiner

*Primary Examiner* — Basia Ridley
*Assistant Examiner* — James Erwin
(74) *Attorney, Agent, or Firm* — Robert E. Bushnell, Esq.

(57) ABSTRACT

A cylindrical secondary battery including a center pin having an improved structure is disclosed. The center pin is disposed into a central opening of an electrode assembly of the cylindrical secondary battery. One end portion of the center pin has a larger diameter than a central opening of an electrode assembly, and the center pin is tapered from the one end portion to another end portion of the center pin. The center pin is forcibly pushed into the central opening of the electrode assembly. Because the center pin is coupled by forced insertion with the central opening of the electrode assembly, movement of the center pin is suppressed and noise generation is prevented.

11 Claims, 2 Drawing Sheets

CYLINDRICAL SECONDARY BATTERY INCLUDING CENTER PIN HAVING IMPROVED STRUCTURE

CLAIM OF PRIORITY

This application makes reference to, incorporates the same herein, and claims all benefits accruing under 35 U.S.C. §119 from an application earlier filed in the Korean Intellectual Property Office on 1 Oct. 2009 and there duly assigned Serial No. 10-2009-0094049.

BACKGROUND OF THE INVENTION

1. Field of the Invention

One or more embodiments of the present invention relate to a cylindrical secondary battery, and more particularly, to a cylindrical secondary battery including a center pin having an improved structure.

2. Description of the Related Art

Secondary batteries are rechargeable batteries, which are widely used in portable electronic devices such as mobile phones, notebook computers, camcorders, etc. According to their shape, the secondary batteries are classified into cylindrical, square, pouch-shaped batteries, and the like.

A cylindrical secondary battery includes an electrode assembly formed by winding a stack of an anode plate, a cathode plate, and a separator disposed between the anode and cathode plates in a jelly roll shape. The electrode assembly is inserted through an opening of a cylindrical case into the cylindrical case, and a cap assembly seals the opening.

At this point, a center pin is inserted into a central opening of the electrode assembly to maintain the jelly roll shape. Also, the center pin is inserted into a lower end portion to press a cathode plate tab connected to the cathode plate and to make the cathode plate tab contact the cylindrical case. Accordingly, the center pin and the cylindrical case are stuck together and the jelly roll is tightly maintained by inserting the electrode assembly into the cylindrical case and inserting the center pin into the central opening of the electrode assembly.

In general, the center pin is a cylindrical member having a diameter slightly smaller than a diameter of the central opening of an electrode assembly. For example, when the electrode assembly has a central opening with a diameter of 3 mm, a cylindrical center pin with a diameter of about 2 mm is inserted into the central opening of the electrode assembly to perform the above-mentioned function. However, in this case, even though the center pin is easily inserted into the central opening, noise is generated due to collision of the center pin with the electrode assembly when a product including the cylindrical secondary battery is shaken. That is, since the central opening is larger than the center pin, a space is formed between the center pin and the electrode assembly, and the center pin is shaken when the secondary battery is moved. As the center pin moves inside the central opening, the center pin collides with a side wall of the electrode assembly surrounding the central opening, thereby generating noise. Such noise may affect the reliability of the product, and thus, a center pin not generating noise is required.

SUMMARY OF THE INVENTION

One or more embodiments of the present invention include a cylindrical secondary battery having an improved structure for preventing noise generated due to collision of a center pin with an electrode assembly.

Additional aspects will be set forth in part in the description which follows and, in part, will be apparent from the description, or may be learned by practice of the presented embodiments.

According to one or more embodiments of the present invention, a cylindrical secondary battery includes an electrode assembly, a cylindrical case accommodating the electrode assembly, a cap assembly coupled with an opening of the cylindrical case, and a center pin inserted into a central opening of the electrode assembly. The electrode assembly is formed by winding an anode plate, a cathode plate, and a separator. At least one portion of the center pin has a larger diameter than the central opening of the electrode assembly.

The center pin may have a first end portion and a second end portion. The first end portion is disposed closer to the cap assembly than the second end portion. The first end portion may be the at least one portion of the center pin.

A diameter of the first end portion may be the largest diameter among diameters of portions of the center pin. The center pin may be gradually tapered from the first end portion to the second end portion. The first end portion of the center pin may be coupled into the central opening of the electrode assembly by forced insertion.

The center pin may further have a third portion between the first and second end portions. Diameters of portions of the center pin between the third portion and the second end portion may be substantially the same. The center pin may be tapered from the first end portion to the third portion.

According to other embodiments of the present invention, a cylindrical secondary battery includes an electrode assembly, a cylindrical case accommodating the electrode assembly, a cap assembly coupled with an opening of the cylindrical case, and a center pin. The electrode assembly is formed by winding a stack of an anode plate, a separator and a cathode plate. The electrode assembly has a central opening substantially parallel to a winding axis of the stack. The center pin is inserted into the central opening of the electrode assembly. A diameter of at least one portion of the center pin is larger than an average diameter of the central opening of the electrode assembly.

In a cylindrical secondary battery according to one or more embodiments of the present invention, the center pin is coupled by forced insertion with the central opening of the electrode assembly, and thus movement of the center pin is suppressed in use, thereby preventing noise.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
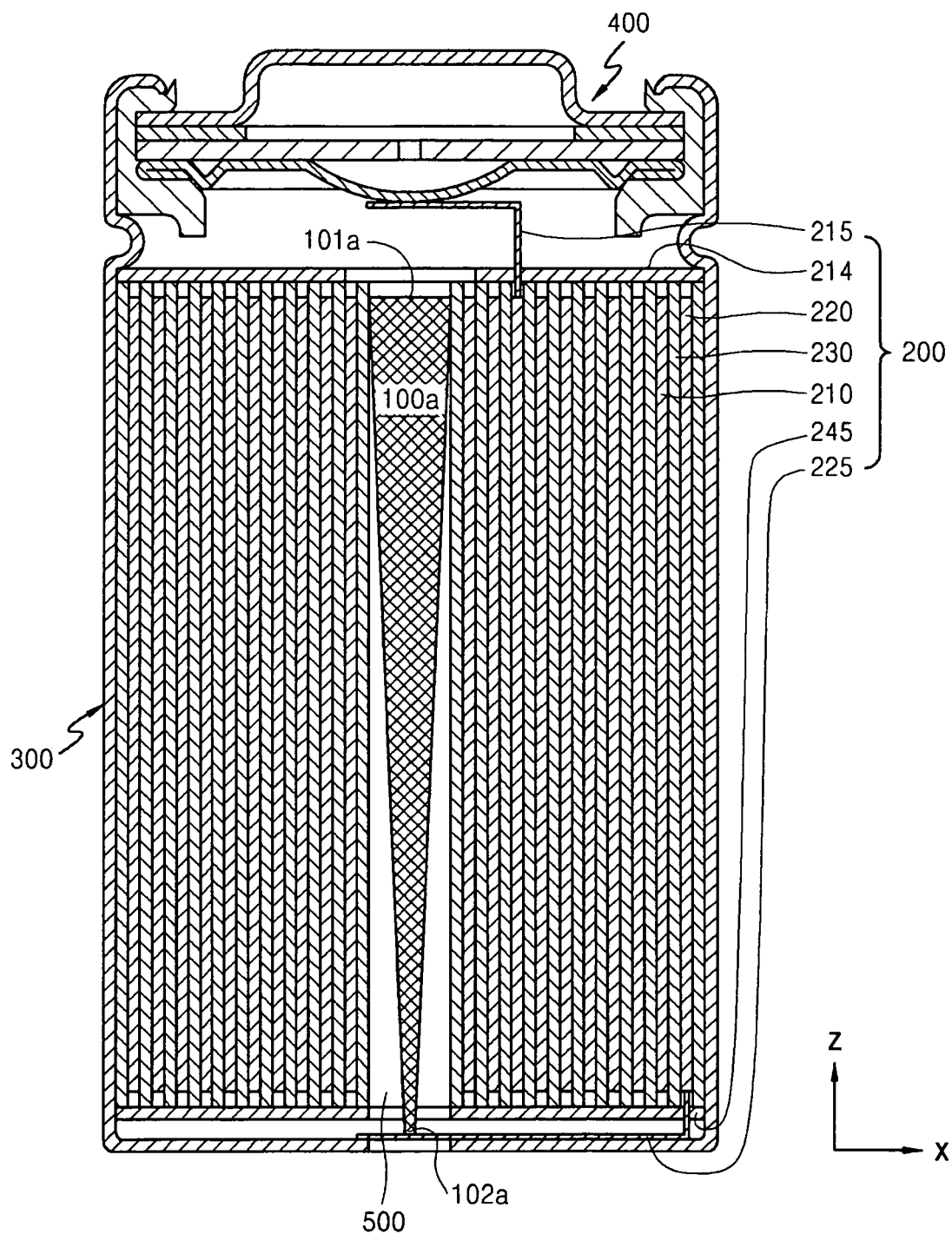
FIG. 1 illustrates a structure of a cylindrical secondary battery according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

FIG. 1 illustrates a structure of a cylindrical secondary battery according to an embodiment of the present invention. The cylindrical secondary battery includes an electrode assembly 200, a case 300, and a cap assembly 400. The electrode assembly 200 is formed by winding a stack of an anode plate 210, a cathode plate 220, and a separator 230 in a jelly roll shape. The separator 230 is disposed between the anode plate 210 and the cathode plate 220. The case 300 accommodates the electrode assembly 200. The cap assembly 400 is coupled to an opening of the case 300. Accordingly, the electrode assembly 200 is inserted through the opening of the case 300 into the case 300, and the cap assembly 400 seals the opening of the case 300, and thus a bare cell which safely accommodates the electrode assembly 200 is prepared. The electrode assembly 200 has a central opening 500 that is formed parallel to a winding axis (z-axis) of the stack of the anode plate 210, the cathode plate 220 and the separator 230, about which the stack is wound to form the jelly roll shape.

A center pin 100a is inserted into the central opening 500 of the electrode assembly 200 to maintain the jelly roll shape. Also, the center pin 100a is pushed down to a lower end portion of the case 300 to press a cathode plate tab 225 connected to the cathode plate 220 of the electrode assembly 200, and to make the cathode plate tab 225 contact a bottom surface of the case 300.

Reference numeral 215 denotes an anode plate tab connected to the anode plate 210. Reference numerals 214 and 245 denote an insulating plate.

Hereinafter, the shape of the center pin 100a according to the current embodiment of the present invention will be described in detail.

The center pin 100a has a conic shape. In other words, the center pin 100a is tapered from one end to another end of the center pin 100a. A first end portion 101a of the center pin 100a, which is arranged adjacent to the cap assembly 400, has the largest diameter. A diameter of the center pin 100a decreases as proceeding from the first end portion 101a toward a second end portion 102a, which is arranged to press the cathode plate tab 225. In other words, the center pin 100a is tapered from the first end portion 101a to the second end portion 102a. The diameter of the first end portion 101a is larger than a diameter of the central opening 500 of the electrode assembly 200. The center pin 100a is forcibly pushed into the central opening 500 in order to make the first end portion 101a of the center pin 100a tightly fit into the central opening 500. In other words, the center pin 100a is coupled with the central opening 500 of the electrode assembly 200 by forced insertion.

After the center pin 100a is coupled into the central opening 500, the first end portion 101a tightly presses a side wall of the central opening 500. Because the diameter of the first end portion 101a is larger than the diameter of the central opening 500, the pressed portion of the central opening 500 may have a larger diameter than other portions of the central opening 500. Accordingly, in the coupled structure, the diameter of the first end portion 101a is larger than an average diameter of the central opening 500 over a length of the central opening 500. Herein, the length of the central opening 500 is a size of the central opening along a winding axis of the stack of the anode plate 210, cathode plate 220, and separator 230. The winding axis is marked as z-axis in FIG. 1.

Since the second end portion 102a is relatively thin, the forced insertion is easily performed until the first portion 101a reaches an entrance of the central opening 500 of the electrode assembly 200. Thus, after the insertion of the first end portion 101a into the central opening 500, the center pin 100a may not move inside the central opening 500 of the electrode assembly 200, even when a product including the cylindrical secondary battery of the present embodiment is shaken. Accordingly, there is no collision between the center pin 100a and a side wall of the electrode assembly 200 that surrounds the central opening 500 of the electrode assembly 200. Therefore, no noise is generated by the center pin 100a. The overall thickness (or a diameter) of the center pin 100a may be bigger than the central opening 500 of the electrode assembly 200, but in this case, the center pin 100a may not be easily inserted into the central opening 500.

Accordingly, in the current embodiment of the present invention, the second end portion 102a, which is first inserted into the central opening 500, is thin, and the first portion 101a, which is finally coupled into the central opening 500, is thick. In this case, the center pin 100a may be easily inserted into the central opening 500, tightly fitting into the central opening 500. Therefore, a generation of noise may be prevented.

Figure 2:
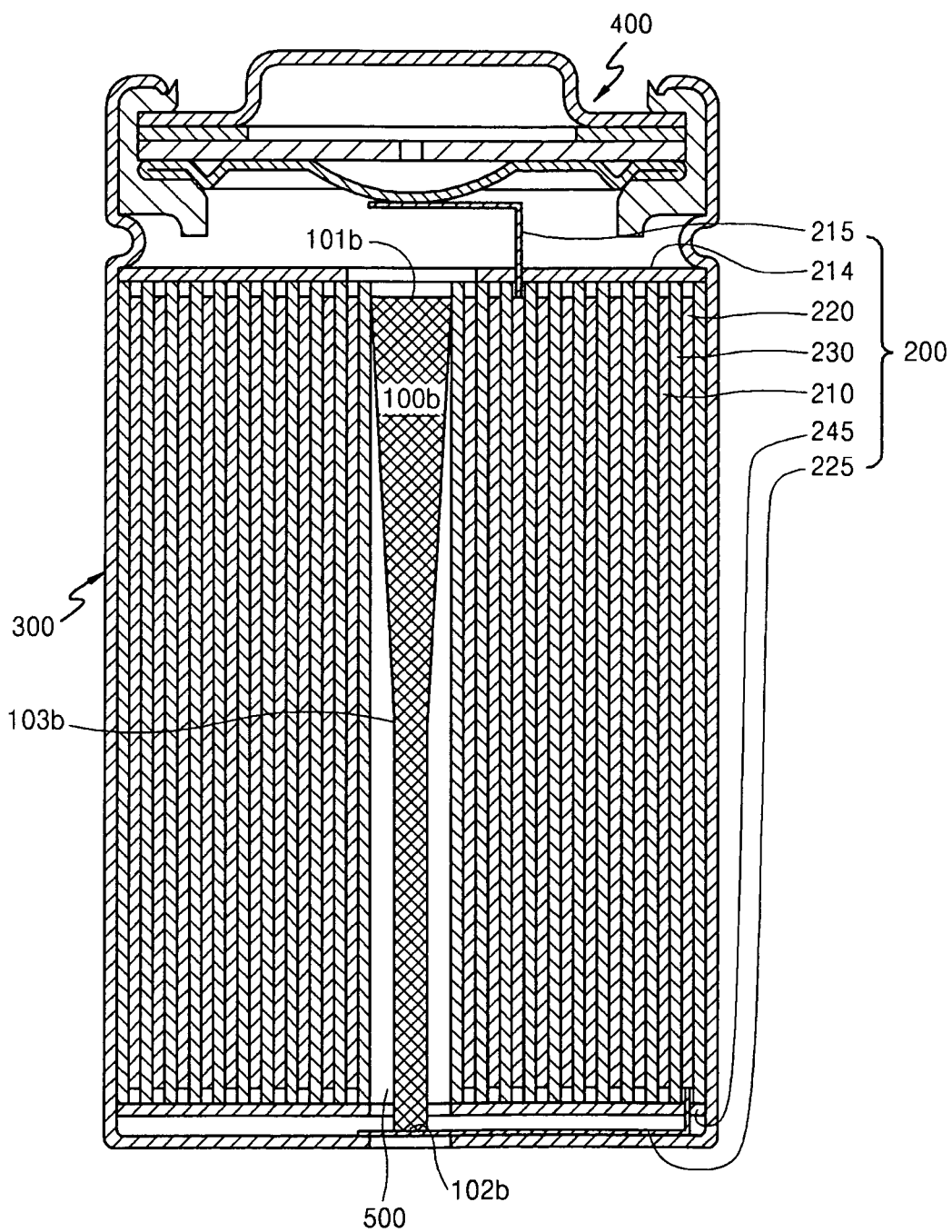
FIG. 2 illustrates a structure of a cylindrical secondary battery according to another embodiment of the present invention.

FIG. 2 illustrates a cylindrical secondary battery according to another embodiment of the present invention. The same reference numerals as in FIG. 1 represent elements having substantially the same functions.

In the current embodiment, a center pin 100b is formed to have a different shape from the previous embodiment. The center pin 100b has a first end portion 101b arranged closer to the cap assembly 400, and has a second end portion 102b arranged closer to the cathode plate tab 225. As illustrated in FIG. 2, the center pin 100b has a tapered shape only in some portions of the center pin 100b. In other words, a diameter of the center pin 100b does not constantly decrease all the way from the first end portion 101b to the second other end portion 102b. Instead, the center pin 100b has two portions: a first portion and a second portion. A third portion 103b of the center pin 100b is defined as an interface between the first portion and the second portion.

The first portion, which is formed between the first end portion 101b and the third portion 103b, has a conic shape. A diameter of the first portion of the center pin 100b decreases gradually as proceeding from the first end portion 101b to a third portion 103b. The second portion, which is formed between the third portion 103b and the second end portion 102b, has a cylindrical shape. A diameter of the second portion of the center pin 100b is substantially constant as proceeding from the third portion 103b to the second end portion 102b. Accordingly, the shape of the center pin 100b of FIG. 2 is different from the shape of the center pin 100a of FIG. 1.

A diameter of the first end portion 101b of the center pin 100b is larger than a diameter of the central opening 500, and therefore, the center pin 100b is forcibly pushed into the central opening 500 to make the first end portion 101b of the center pin 100b tightly fit into the central opening 500. In other words, the center pin 100b according to the current embodiment is coupled with a central opening 500 of an electrode assembly 200 by forced insertion. The second end portion 102b is relatively thin and is smoothly inserted into the central opening 500. The first end portion 101b, which has thicker than the central opening 500, tightly fits into the central opening 500 after the forced insertion. The tight fit of the first end portion 101b into the central opening 500 may prevent a movement of the center pin 100b, and noise generation may be prevented.

As described above, according to the one or more of the above embodiments of the present invention, the center pin is coupled by forced insertion with the central opening of the electrode assembly, and therefore movement of the center pin is suppressed, thereby preventing noise from being generated.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A cylindrical secondary battery comprising:
   an electrode assembly formed by winding a stack of an anode plate, a separator and a cathode plate;
   a cylindrical case accommodating the electrode assembly;
   a cap assembly coupled with an opening of the cylindrical case; and
   a center pin inserted into a central opening of the electrode assembly, the center pin having a first end and a second end, the first end of the center pin having a diameter larger than a diameter of the central opening of the electrode assembly,
   the diameter of the first end of the center pin being the largest diameter of the center pin, the center pin being gradually tapered from the first end, the center pin having a first end portion including the first end and a second end portion including the second end, the first end portion being disposed closer to the cap assembly than the second end portion.

2. The cylindrical secondary battery of claim 1, wherein the center pin is gradually tapered from the first end portion to the second end portion.

3. The cylindrical secondary battery of claim 1, wherein the first end portion of the center pin is coupled into the central opening of the electrode assembly by forced insertion.

4. The cylindrical secondary battery of claim 1, wherein the center pin has a first end portion including the first end and a second end portion including the second end, the first end portion being disposed closer to the cap assembly than the second end portion, the center pin further having a third portion between the first and second end portions, diameters of portions of the center pin between the third portion and the second end portion being substantially the same.

5. The cylindrical secondary battery of claim 4, wherein the center pin is tapered from the first end portion to the third portion.

6. The cylindrical secondary battery of claim 4, wherein the first end portion of the center pin is coupled into the central opening of the electrode assembly by forced insertion.

7. A cylindrical secondary battery comprising:
   an electrode assembly formed by winding a stack of an anode plate, a separator and a cathode plate, the electrode assembly having a central opening substantially parallel to a winding axis of the stack;
   a cylindrical case accommodating the electrode assembly;
   a cap assembly coupled with an opening of the cylindrical case; and
   a center pin inserted into the central opening of the electrode assembly, the center pin having a first end and a second end, a diameter of the first end of the center pin being larger than an average diameter of the central opening of the electrode assembly, the diameter of the first end of the center pin being the largest diameter of the center pin, the center pin being gradually tapered from the first end, the center pin having a first end portion including the first end and a second end portion including the second end, the first end portion being disposed closer to the cap assembly than the second end portion.

8. The cylindrical secondary battery of claim 7, wherein the center pin is gradually tapered from the first end portion to the second end portion.

9. The cylindrical secondary battery of claim 7, wherein the at least one portion of the center pin presses a side wall of the central opening of the electrode assembly.

10. The cylindrical secondary battery of claim 7, wherein the center pin has a first end portion including the first end and a second end portion including the second end, the first end portion being disposed closer to the cap assembly than the second end portion, the center pin further having a third portion between the first and second end portions, diameters of portions of the center pin between the third portion and the second end portion being substantially the same.

11. The cylindrical secondary battery of claim 10, wherein the center pin is tapered from the first end portion to the third portion.

* * * * *